United States Patent
Whaley

(10) Patent No.: US 10,639,730 B2
(45) Date of Patent: May 5, 2020

(54) RING SIZING TOOL

(71) Applicant: EURO TOOL, INC., Grandview, MO (US)

(72) Inventor: Jay Nicholas Whaley, San Diego, CA (US)

(73) Assignee: EURO TOOL, INC., Grandview, MO (US)

( * ) Notice: Subject to any disclaimer, the term of this patent is extended or adjusted under 35 U.S.C. 154(b) by 211 days.

(21) Appl. No.: 15/963,553

(22) Filed: Apr. 26, 2018

(65) Prior Publication Data

US 2019/0329338 A1    Oct. 31, 2019

(51) Int. Cl.
| | |
|---|---|
| *G01B 5/08* | (2006.01) |
| *B23D 49/10* | (2006.01) |
| *A44C 27/00* | (2006.01) |
| *B21D 53/44* | (2006.01) |
| *G01B 5/02* | (2006.01) |

(52) U.S. Cl.
CPC ............ *B23D 49/105* (2013.01); *A44C 27/00* (2013.01); *B21D 53/44* (2013.01); *G01B 5/02* (2013.01)

(58) Field of Classification Search
CPC ................................ A44C 27/00; B21D 53/44
USPC ........................................................ 33/555.1
See application file for complete search history.

(56) References Cited

U.S. PATENT DOCUMENTS

| | | | | |
|---|---|---|---|---|
| 1,888,416 | A * | 11/1932 | Williams | G01B 3/20 |
| | | | | 33/544.5 |
| 2,273,358 | A * | 2/1942 | Hyde | B21D 53/44 |
| | | | | 29/8 |
| 2,971,262 | A * | 2/1961 | Muller | A24C 5/34 |
| | | | | 33/700 |
| 4,224,728 | A * | 9/1980 | Paolino | A44C 9/02 |
| | | | | 29/896.412 |
| 4,626,145 | A | 12/1986 | Vasquez | |
| 6,279,244 | B1 * | 8/2001 | Kelley | A44C 9/02 |
| | | | | 33/512 |
| 7,181,858 | B2 | 2/2007 | Haug | |
| 7,845,077 | B1 * | 12/2010 | Alulis | A44C 9/02 |
| | | | | 264/296 |
| 9,671,209 | B2 | 6/2017 | O'Hara | |
| 2003/0084583 | A1 * | 5/2003 | Arikawa | F16G 5/16 |
| | | | | 33/555.1 |
| 2005/0235511 | A1 * | 10/2005 | Tkachyk | G01B 5/213 |
| | | | | 33/555.1 |
| 2015/0033570 | A1 * | 2/2015 | Bernabe | G01B 3/34 |
| | | | | 33/555.1 |

(Continued)

*Primary Examiner* — George B Bennett
(74) *Attorney, Agent, or Firm* — Stinson LLP

(57) ABSTRACT

A ring sizing tool with a base and a guide movably coupled to the base. The base has first and second ends with a longitudinal axis extending between the ends. A cut guide surface is positioned adjacent the second end, and a base ring engaging surface is spaced apart from the cut guide surface. The guide has a guide ring engaging surface and at least one ring size indication spaced apart from the guide ring engaging surface. The guide is movable with respect to the base in a direction aligned with the longitudinal axis of the base between at least a first position, in which the guide ring engaging surface abuts the base ring engaging surface, and a second position, in which the guide ring engaging surface is spaced a distance from the base ring engaging surface. A method for sizing a ring with the ring sizing tool.

20 Claims, 6 Drawing Sheets

(56) References Cited

U.S. PATENT DOCUMENTS

2019/0239604 A1* 8/2019 Somar .................. B22D 25/026

* cited by examiner

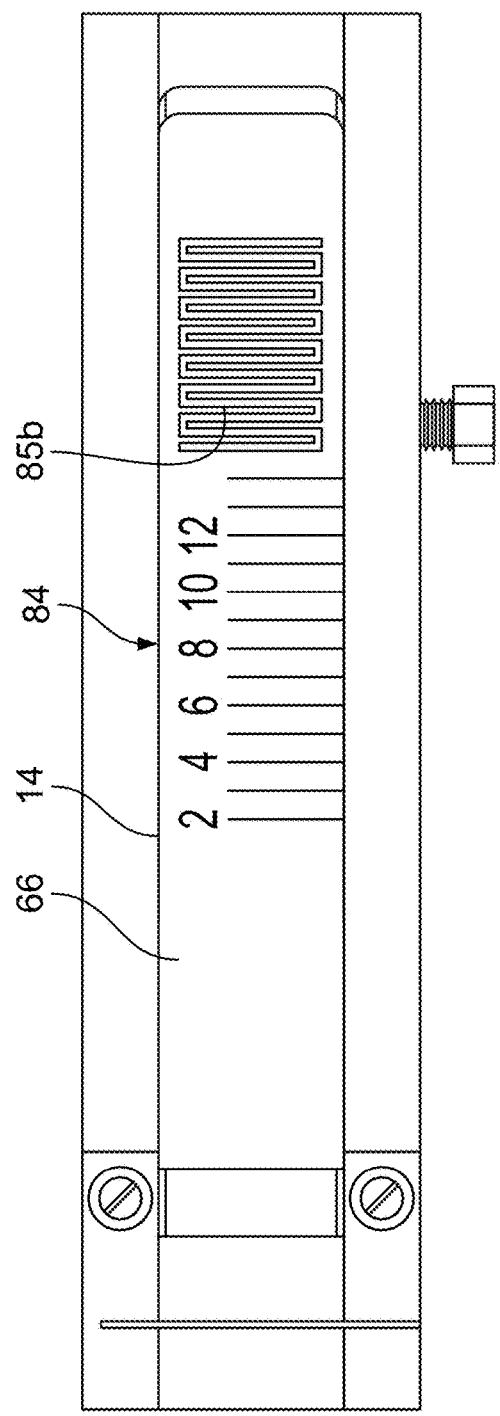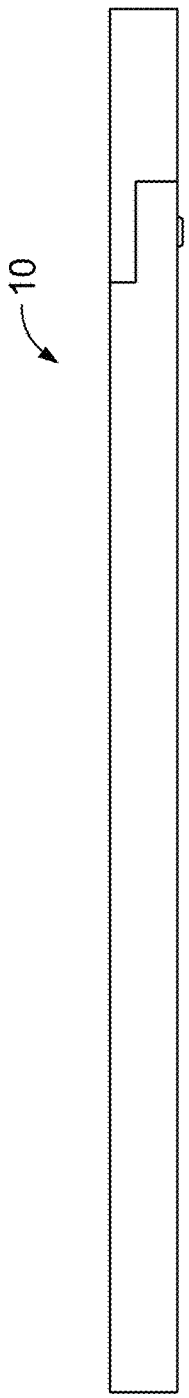
FIG. 10
FIG. 11

RING SIZING TOOL

CROSS-REFERENCE TO RELATED APPLICATIONS

Not applicable.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The invention relates generally to a ring sizing tool and, in particular, to a ring sizing tool for measuring a ring blank.

2. Description of Related Art

When making a ring, a jeweler must determine the length of a ring blank that is necessary to make a ring of a desired size. One method for determining a desired ring blank length includes determining the inside ring circumference corresponding to the desired ring size and adding the thickness of the ring blank to the inside ring circumference to determine an overall ring blank length. The ring blank is then cut to that length before being formed into a ring. In performing this method, a jeweler may measure the length of the ring blank that corresponds with the desired inside ring circumference, estimate the thickness of the ring blank, and cut the blank to be longer than the initial measurement to add in the estimated thickness. Estimating the ring blank thickness makes it difficult for a jeweler to consistently make rings of a desired size. Further, when making rings of different sizes, the jeweler must follow the relatively time-consuming steps of determining the inside circumferences corresponding to each of the different ring sizes and measuring the length of one or more ring blanks corresponding to those circumferences.

BRIEF SUMMARY OF THE INVENTION

A ring sizing tool in accordance with the invention described herein includes a base and a guide that is movably coupled to the base. The base has a first end and a second end with a longitudinal axis of the base extending from the first end to the second end. The base has a cut guide surface positioned adjacent the second end. The base has a base ring engaging surface that is spaced apart from the cut guide surface toward the first end of the base. The guide has a guide ring engaging surface and at least one ring size indication that is spaced apart from the guide ring engaging surface. The guide is movable with respect to the base in a direction that is aligned with the longitudinal axis of the base between at least a first position, in which the guide ring engaging surface abuts the base ring engaging surface, and a second position, in which the guide ring engaging surface is spaced a distance from the base ring engaging surface.

The ring sizing tool is preferably used to measure the length of a ring blank necessary to make a ring of a desired size, and the tool can preferably guide a jeweler's cutting of the ring blank to the measured length. Preferably, the guide includes a plurality of ring size indications that are spaced apart from each other and that each correspond with a different ring size. The ring sizing tool preferably includes a slot that is formed in the base and configured for receiving a jeweler's saw blade, wherein the cut guide surface and a second cut guide surface of the base are positioned on opposite sides of the slot. The guide is preferably releasably lockable to the base when the guide is in the second position, in which the distance between the base and guide ring engaging surfaces is approximately equal to the thickness of a ring blank.

The invention also encompasses a method for sizing a ring with a ring sizing tool as described above in accordance with the following steps: inserting a ring blank into a space between the base ring engaging surface and the guide ring engaging surface; moving the guide with respect to the base until each of the base ring engaging surface and the guide ring engaging surface abuts the ring blank; removing the ring blank from the space between the base ring engaging surface and the guide ring engaging surface; aligning one end of the ring blank with the ring size indication; and cutting the ring blank in a plane that is generally aligned with the cut guide surface.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 10 is a bottom plan view of the ring sizing tool of FIG. 1; and

FIG. 11 is a left side elevational view of the ring sizing tool of FIG. 1.

DETAILED DESCRIPTION OF PREFERRED EMBODIMENT

Figure 1:
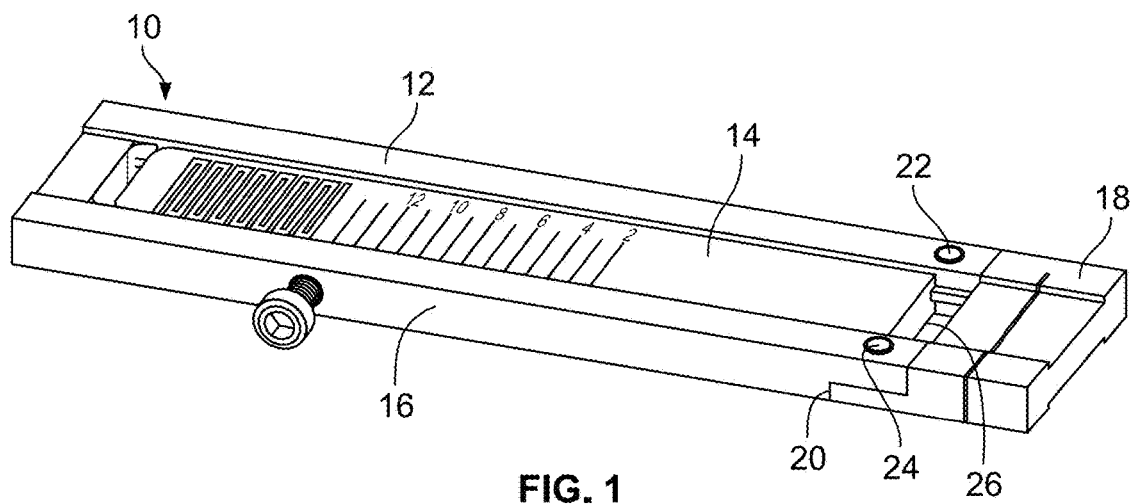
FIG. 1 is a perspective view of a ring sizing tool in accordance with one embodiment of the invention described herein.

A ring sizing tool in accordance with an embodiment of the invention described herein is identified generally as 10 in FIG. 1. Ring sizing tool 10 includes a base 12 and a guide 14 that is slidably coupled to the base 12. As described herein, ring sizing tool 10 allows a jeweler to quickly determine the length of a ring blank needed to make a ring of a particular ring size from the ring blank while taking into account the thickness of the ring blank. Ring sizing tool 10 also provides a guide that allows the jeweler to cut the ring blank to the desired length.

Base 12 includes a first section 16 and a second section 18 that mate together in a shiplap joint 20 and are joined together with screws 22 and 24. It is within the scope of the invention for the first section 16 to be joined with the second section 18 in any manner. Base 12 is preferably formed from separate first and second sections 16 and 18 to allow guide 14 to be slidably inserted into and retained within a slot 26 formed in base 12.

Figure 2:
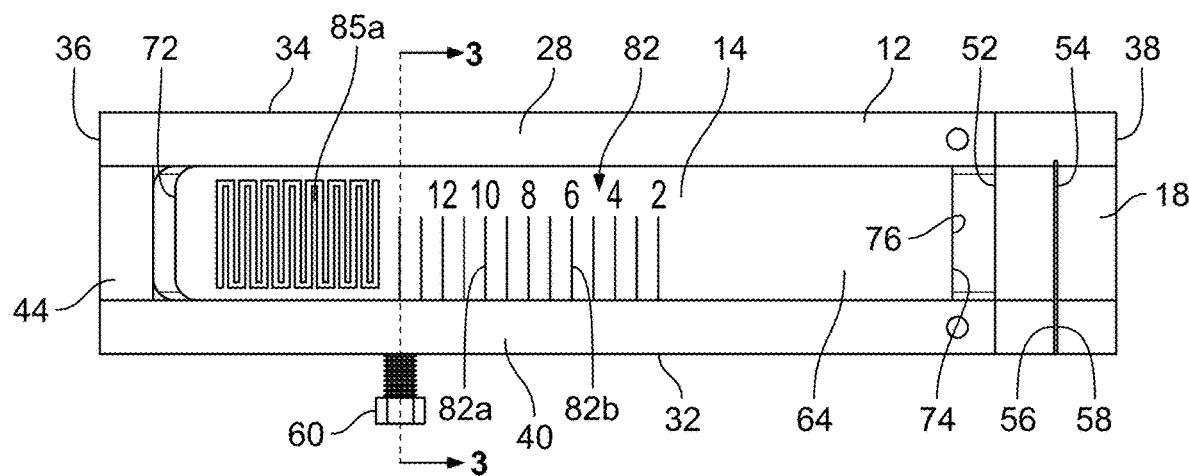
FIG. 2 is a top plan view of the ring sizing tool of FIG. 1.
Figure 3:
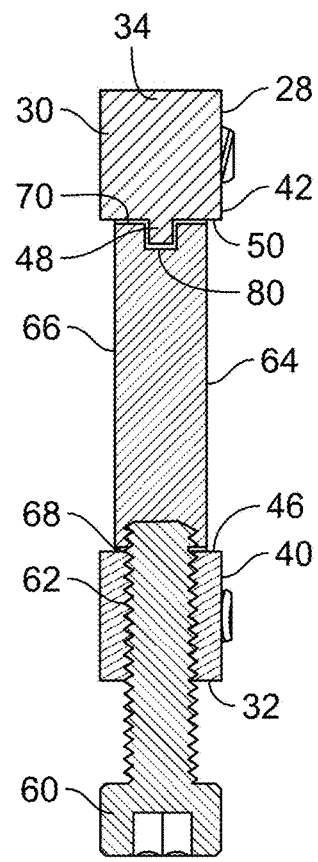
FIG. 3 is a cross-sectional view taken through the line 3-3 shown in FIG. 2.
Figure 4:
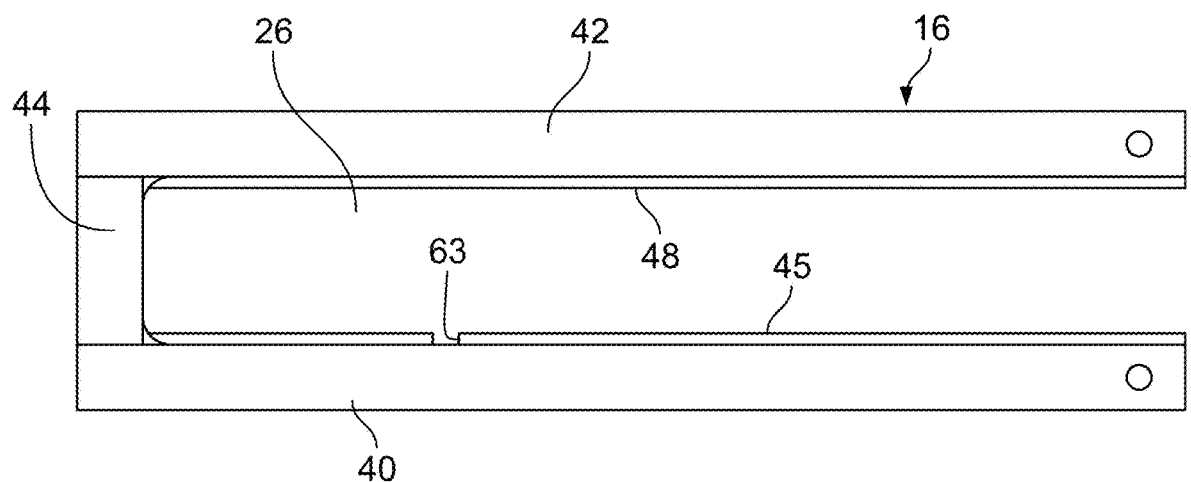
FIG. 4 is a top plan view of a base of the ring sizing tool of FIG. 1.

Referring to FIGS. 2 and 3, base 12 is generally rectangular and has a top surface 28, a bottom surface 30, and side surfaces 32 and 34 that each extend from a first end 36 to a second end 38. A longitudinal axis of base 12 extends from first end 36 to second end 38. As shown in FIG. 4, first section 16 of base 12 is generally C-shaped and includes first and second sides 40 and 42, which are generally parallel to each other. First and second sides 40 and 42 are each integrally joined with an end section 44. First and second sides 40 and 42 are spaced apart from each other to form slot 26 for receiving guide 14. As shown in FIGS. 3 and 4, a first rail 45 is formed on an inner surface 46 of first side 40, and a second rail 48 is formed on an inner surface 50 of second side 42. First and second rails 45 and 48 engage guide 14 as described below.

Second section 18 of base 12 has a base ring engaging surface 52, shown in FIG. 2, that is generally perpendicular to top surface 28 and that faces guide 14. A slot 54 is formed in the second section 18 of base 12 between base ring engaging surface 52 and second end 38. Slot 54 extends from side surface 32 to near side surface 34 in a direction that is generally perpendicular to top surface 28 and the longitudinal axis of base 12. First and second cut guide surfaces 56 and 58 of base 12 are positioned on opposite sides of slot 54 adjacent the second end 38 of base 12. The width of slot 54, or the distance between first and second cut guide surfaces 56 and 58, is preferably slightly larger than the thickness of a jeweler's saw blade so that a jeweler's saw blade may be received by the slot 54. Base ring engaging surface 52 is spaced apart from first and second cut guide surfaces 56 and 58 toward the first end 36 of base 12. Base ring engaging surface 52 and first and second cut guide surfaces 56 and 58 are oriented perpendicular to the longitudinal axis of base 12. In an alternative embodiment, first cut guide surface 56 may form the second end 38 of base 12 with the portion of base 12 shown in FIG. 2 between first cut guide surface 56 and second end 38 being omitted.

As shown in FIGS. 2 and 3, base 12 includes a locking screw 60 that threadably engages a threaded opening 62 extending through first side 40. Referring to FIG. 4, a notch 63 in first rail 45 is sized to receive locking screw 60. Locking screw 60 is configured to engage guide 14 to releasably lock guide 14 to base 12 as described in more detail below.

Referring to FIGS. 2 and 3, guide 14 is generally rectangular and has a top surface 64, a bottom surface 66, and side surfaces 68 and 70 that each extend from a first end 72 to a second end 74. A longitudinal axis of guide 14 extends from first end 72 to second end 74. The width of guide 14, or distance between side surfaces 68 and 70, is slightly less than the width of the slot 26 (FIG. 4) between the first and second sides 40 and 42 of base 12 so that guide 14 may be received within the slot 26. The length of guide 14, or distance between first and second ends 72 and 74, is less than the distance between end section 44 and base ring engaging surface 52 allowing guide 14 to slide within slot 26 between end section 44 and base ring engaging surface 52.

Figure 5:
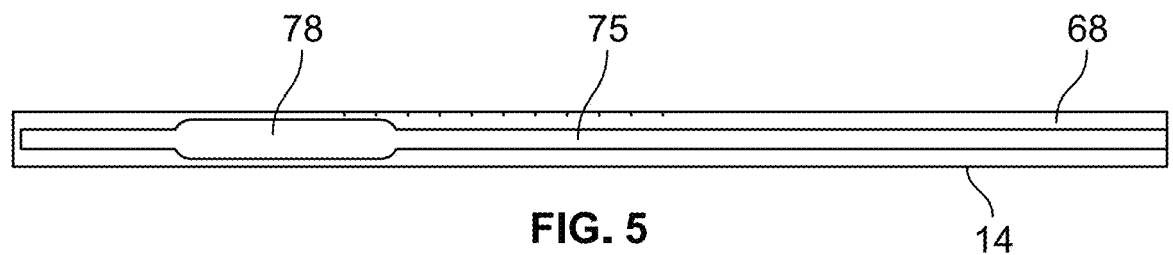
FIG. 5 is a side elevational view of a guide of the ring sizing tool of FIG. 1.
Figure 7:
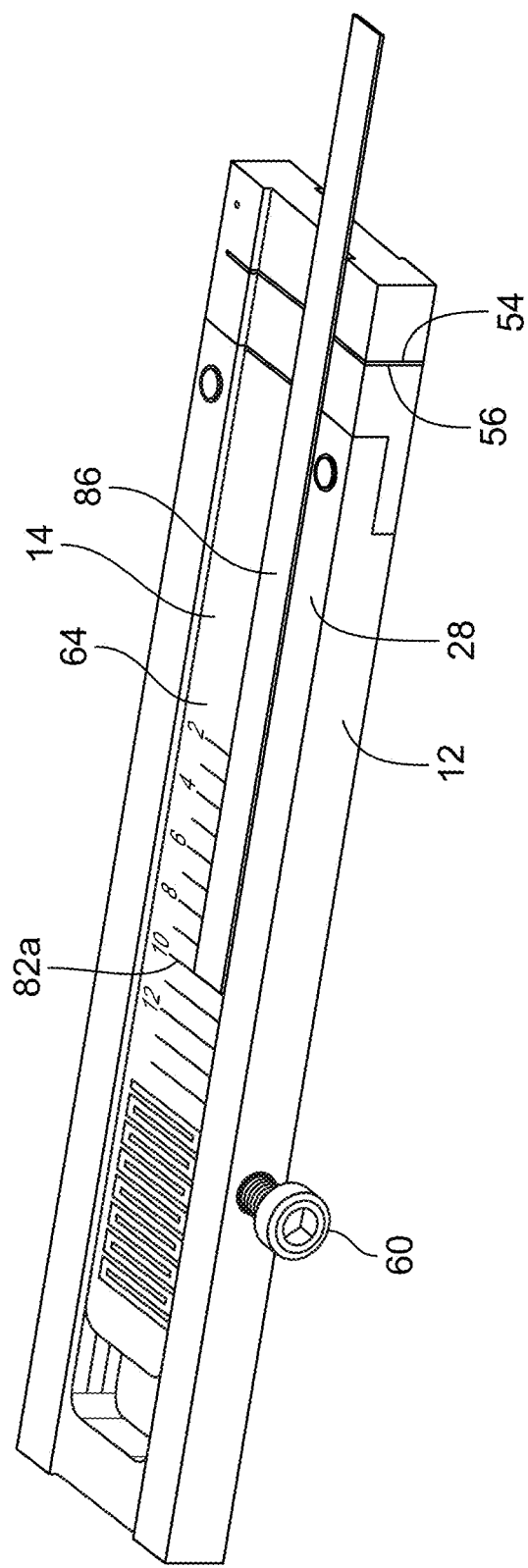
FIG. 7 is a perspective view of the ring sizing tool of FIG. 1 showing an end of the ring blank aligned with a ring size indication of the guide.
Figure 8:
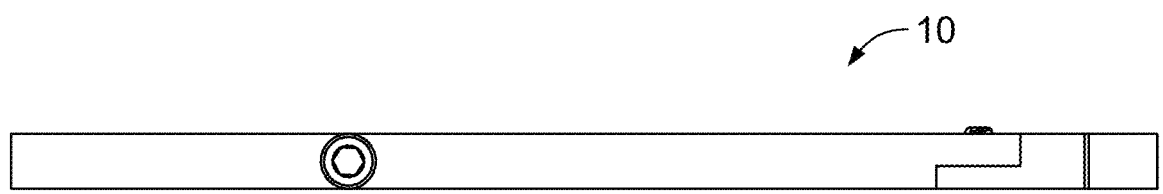
FIG. 8 is a right side elevational view of the ring sizing tool of FIG. 1.
Figure 9:
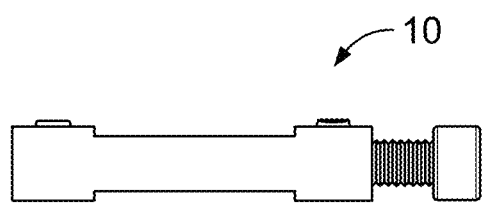
FIG. 9 is a front elevational view of the ring sizing tool of FIG. 1, the rear elevational view being a mirror image thereof.

As shown in FIG. 5, a slot 75 is formed in side surface 68 of guide 14 for slidably receiving first rail 45 (FIG. 4) of base 12. Slot 75 includes an enlarged section 78 for receiving locking screw 60. A slot 80 (FIG. 3) is formed in side surface 70 of guide 14 for slidably receiving second rail 48 of base 12. In an alternative embodiment, base 12 may include slots that are received by rails of guide 14. Guide 14 is slidably coupled to base 12 via slots 75 and 80 and rails 45 and 48. When slots 75 and 80 of guide 14 receive rails 45 and 48 of base 12, the top surface 28 of the base 12 is vertically offset above the top surface 64 of guide 14 and the bottom surface 30 of base 12 is vertically offset below the bottom surface 66 of guide 14, as shown in FIG. 3. The vertical offset between the top surface 28 of base 12 and the top surface 64 of guide 14 allows a ring blank 86 positioned on the top surface 64 of guide 14 to abut the portion of base 12 that is positioned above guide 14, as shown in FIG. 7. This helps a jeweler retain the ring blank 86 in a desired position on guide 14 when cutting the ring blank 86 as described in more detail below. First end 72 of guide 14 is positioned adjacent first end 36 of base 12, and second end 74 of guide 14 is positioned adjacent second end 38 of base 12.

The second end 74 of guide 14 forms a guide ring engaging surface 76 that is generally perpendicular to the top and bottom surfaces 64 and 66 of guide 14 and the longitudinal axis of base 12. Guide ring engaging surface 76 is spaced apart from first cut guide surface 56 toward the first end 36 of base 12. Guide 14 is slidable with respect to base 12 in a direction that is aligned with the longitudinal axis of base 12 between a first position, in which guide ring engaging surface 76 abuts base ring engaging surface 52, and a plurality of second positions, in which guide ring engaging surface 76 is spaced a distance from base ring engaging surface 52 to allow placement of a ring blank between the base ring engaging surface 52 and guide ring engaging surface 76. Guide 14 is releasably lockable to base 12 via locking screw 60 in any of the positions of guide 14. This allows a jeweler to set the distance between the base ring engaging surface 52 and guide ring engaging surface 76 at the thickness of a ring blank, as described in more detail below.

As shown in FIG. 2, top surface 64 of guide 14 includes a plurality of ring size indications 82, two of which are specifically identified as a first ring size indication 82a and a second ring size indication 82b. The ring size indications 82 are grooves that are oriented parallel to first cut guide surface 56, base ring engaging surface 52, and guide ring engaging surface 76; however, it is within the scope of the invention for the ring size indications 82 to be any type of marking or line on top surface 64. Each of the ring size indications 82 is spaced apart from the guide ring engaging surface 76 toward first end 72 in a direction aligned with the longitudinal axis of base 12. The ring size indications 82 are spaced apart from each other in a direction that is aligned with the longitudinal axis of base 12.

Each of the ring size indications 82 corresponds with a different ring size. For example, first ring size indication 82a corresponds with a first ring size, which is a ring size 10 on the U.S. ring size scale, and second ring size indication 82b corresponds with a second ring size, which is a ring size 6 on the U.S. ring size scale. The first ring size indication 82a is spaced a first distance from the first cut guide surface 56, and the second ring size indication 82b is spaced a second distance from the first cut guide surface 56 that is less than the first distance. Thus, the first ring size indication 82a corresponds with a ring size that is greater than the second ring size indication 82b. The other ring size indications 82 correspond with ring sizes from 2 to 14 on the U.S. ring size scale. The ring size indications 82 may alternatively correspond with ring sizes on any other type of ring size scale, such as the European ring size scale. The distance between each ring size indication 82 and first cut guide surface 56 when base ring engaging surface 52 abuts guide ring engaging surface 76 is preferably approximately equal to the inner circumference of a ring sized to correspond with the ring size indication 82.

Referring to FIG. 10, bottom surface 66 of guide 14 includes a plurality of ring size indications 84. The ring size indications 84 on bottom surface 66 are substantially similar to the ring size indications 82 on top surface 64 and thus are not described in detail herein. While the ring size indications 82 on top surface 64 are preferably provided for use by a jeweler who is right-handed, the ring size indications 84 on bottom surface 66 are preferably provided for use by a jeweler who is left-handed. Alternatively, the ring size indications 84 on bottom surface 66 may correspond with ring sizes on a different ring size scale than the ring size indications 82 on top surface 64.

Guide 14 also includes engraved patterns 85a-b on top surface 64 and bottom surface 66, respectively. Engraved patterns 85a-b allow a jeweler to frictionally engage guide 14 with a thumb or finger and slide guide 14 with respect to base 12. Top surface 64 and bottom surface 66 may alternatively be provided with another type of grip enhancing feature besides or in addition to engraved patterns 85a-b, such as raised bumps or a knurled surface. Engraved patterns 85a-b and ring size indications 82, 84 are preferably engraved or etched in guide 14 for durability so that they do not significantly wear down or off during use.

Figure 6:
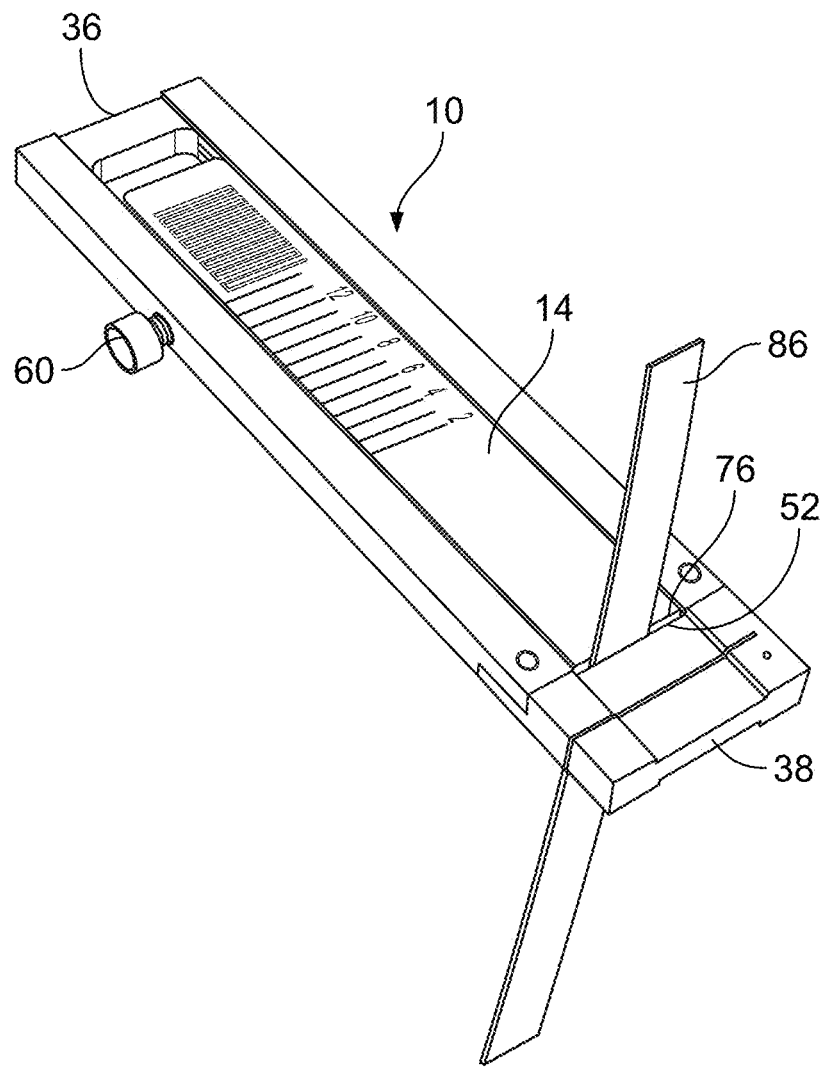
FIG. 6 is a perspective view of the ring sizing tool of FIG. 1 showing a ring blank positioned between the guide and the base.

As shown in FIG. 6, base ring engaging surface 52 and guide ring engaging surface 76 are configured to engage a ring blank 86 when guide 14 is in the second position (i.e., when guide ring engaging surface 76 is spaced a distance from base ring engaging surface 52). When base ring engaging surface 52 and guide ring engaging surface 76 engage the ring blank 86, the distance between base ring engaging surface 52 and guide ring engaging surface 76 corresponds to the thickness of ring blank 86.

The first section 16 of base 12 and guide 14 are preferably formed from a relatively light weight and durable material, such as aluminum, brass, or any other suitable material. The material may be anodized for color and durability. The second section 18 of base 12 is preferably formed from a relatively hard material that will not be significantly damaged when a saw blade is inserted into slot 54 for cutting a ring blank 86, such as hardened tool steel.

In use, a jeweler may use ring sizing tool 10 to size a ring by measuring and cutting ring blank 86 to a desired length corresponding with a particular ring size in accordance with the following steps. First, with reference to FIGS. 6 and 7, the jeweler unlocks guide 14 from base 12 by turning locking screw 60. The jeweler slides guide 14 toward first end 36 of base 12 and inserts ring blank 86 into the space between base ring engaging surface 52 and guide ring engaging surface 76, as shown in FIG. 6. The jeweler slides guide 14 toward second end 38 of base 12 until each of base ring engaging surface 52 and guide ring engaging surface 76 abuts ring blank 86. Guide 14 is then releasably locked to base 12 by turning locking screw 60 until it engages guide 14. By locking guide 14 to base 12, the distance between base ring engaging surface 52 and guide ring engaging surface 76 is set at the thickness of ring blank 86. Ring blank 86 is then removed from the space between base ring engaging surface 52 and guide ring engaging surface 76. The jeweler places ring blank 86 on top surface 64 of guide 14, as shown in FIG. 7, and abuts a side of ring blank 86 with the portion of base 12 that is raised above, or vertically offset from, top surface 64 of guide 14. One end of ring blank 86 is aligned with one of the ring size indications 82. FIG. 7 shows an end of ring blank 86 aligned with first ring size indication 82a, which corresponds with ring size 10 as described above. The jeweler holds the ring blank 86 against base 12 and guide 14 in this position with one hand, and inserts a jeweler's saw blade into slot 54 with the other hand. Alternatively, the jeweler may use a clamp to clamp ring blank 86 to the base 12 and guide 14. The jeweler engages ring blank 86 with the saw blade and moves the saw blade back and forth to cut ring blank 86 in a plane that is generally aligned with first cut guide surface 56. The ring blank 86 may then be formed into a ring having a ring size corresponding to the ring size indication 82 used, which in this example is a ring size 10.

Ring sizing tool 10 may be used to size ring blanks of varying thicknesses to a desired length corresponding with a particular ring size in accordance with the steps described above. As the length of a ring blank that is necessary to form a ring having a particular ring size increases as the thickness of the ring blank increases, ring sizing tool 10 takes into account the thickness of the ring blank when measuring the length of the ring blank necessary to form a ring having the desired ring size. When a jeweler performs the steps described above, the distance between each of ring size indications 82 and first cut guide surface 56 is increased by the thickness of ring blank 86 before ring blank 86 is cut at the desired length corresponding to the ring size indication 82 aligned with the end of ring blank 86. Ring sizing tool 10 may be used to measure and cut ring blanks of a variety of different materials such as gold, silver, platinum, stainless steel, copper, and brass.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A ring sizing tool comprising:
   a base comprising a first end and a second end, wherein a longitudinal axis of the base extends from the first end to the second end, wherein the base comprises a cut guide surface positioned adjacent the second end of the base, and wherein the base comprises a base ring engaging surface that is spaced apart from the cut guide surface toward the first end of the base; and a guide comprising a guide ring engaging surface and at least one ring size indication that is spaced apart from the guide ring engaging surface, wherein the guide is movably coupled to the base, wherein the guide is movable with respect to the base in a direction that is aligned with the longitudinal axis of the base between at least a first position, in which the guide ring engaging surface abuts the base ring engaging surface, and a second position, in which the guide ring engaging surface is spaced a distance from the base ring engaging surface.

2. The ring sizing tool of claim 1, wherein a slot is formed in the base, wherein the cut guide surface and a second cut guide surface of the base are positioned on opposite sides of the slot.

3. The ring sizing tool of claim 1, wherein the guide is releasably lockable to the base when the guide is in the second position.

4. The ring sizing tool of claim 3, wherein the base comprises a locking screw that is configured to engage the guide to releasably lock the guide to the base when the guide is in the second position.

5. The ring sizing tool of claim 1, wherein the guide comprises a plurality of ring size indications spaced apart from each other in a direction that is aligned with the longitudinal axis of the base.

6. The ring sizing tool of claim 5, wherein the plurality of ring size indications comprise at least a first ring size indication that corresponds with a first ring size and a second ring size indication that corresponds with a second ring size, wherein the first ring size indication is spaced a first distance from the cut guide surface when the guide is in the second position, wherein the second ring size indication is spaced a second distance from the cut guide surface when the guide is in the second position, and wherein the first distance is less than the second distance.

7. The ring sizing tool of claim 1, wherein the cut guide surface, the base ring engaging surface, and the guide ring engaging surface are oriented perpendicular to the longitudinal axis of the base.

8. The ring sizing tool of claim 1, wherein the guide comprises a first end positioned adjacent the first end of the base, wherein the guide comprises a second end positioned adjacent the second end of the base, and wherein the guide ring engaging surface is spaced apart from the cut guide surface toward the first end of the base.

9. The ring sizing tool of claim 1, wherein one of the guide and the base comprises a rail that is slidably received by a slot formed in the other of the guide and the base.

10. The ring sizing tool of claim 1, wherein the base ring engaging surface and the guide ring engaging surface are configured to engage a ring blank when the guide is in the second position, and wherein the distance between the base ring engaging surface and the guide ring engaging surface when the guide is in the second position corresponds to the thickness of a ring blank positioned between the base ring engaging surface and the guide ring engaging surface.

11. The ring sizing tool of claim 1, wherein the guide comprises a top surface that is generally perpendicular to the guide ring engaging surface, and wherein the ring size indication is on the top surface of the guide.

12. The ring sizing tool of claim 11, wherein the base comprises a top surface that is generally perpendicular to the base ring engaging surface, and wherein the top surface of the base is vertically offset above the top surface of the guide.

13. The ring sizing tool of claim 11, wherein the guide comprises a bottom surface that is generally perpendicular to the guide ring engaging surface, and wherein a second ring size indication is on the bottom surface of the guide.

14. A method for sizing a ring with a ring sizing tool comprising a base comprising a cut guide surface and a base ring engaging surface that is spaced apart from the cut guide surface, and a guide that is movably coupled to the base, wherein the guide comprises a guide ring engaging surface and at least one ring size indication that is spaced apart from the guide ring engaging surface, the method comprising:

inserting a ring blank into a space between the base ring engaging surface and the guide ring engaging surface;

moving the guide with respect to the base until each of the base ring engaging surface and the guide ring engaging surface abuts the ring blank;

removing the ring blank from the space between the base ring engaging surface and the guide ring engaging surface;

aligning one end of the ring blank with the ring size indication; and cutting the ring blank in a plane that is generally aligned with the cut guide surface.

15. The method of claim 14, further comprising releasably locking the guide to the base after the step of moving the guide with respect to the base.

16. The method of claim 14, further comprising after the step of removing the ring blank, placing the ring blank on a top surface of the guide, and abutting a side of the ring blank with a portion of the base that is raised above the top surface of the guide.

17. The method of claim 14, wherein one of the guide and the base comprises a rail that is slidably received by a slot formed in the other of the guide and the base, and wherein the step of moving the guide with respect to the base comprises sliding the guide with respect to the base.

18. The method of claim 14, further comprising after the step of aligning one end of the ring blank with the ring size indication, inserting a saw blade into a slot formed in the base.

19. The method of claim 14, wherein the guide comprises a plurality of ring size indications spaced apart from each other.

20. The method of claim 14, wherein the base comprises a first end and a second end, wherein a longitudinal axis of the base extends from the first end to the second end, and wherein the guide moves with respect to the base in a direction that is aligned with the longitudinal axis of the base.

* * * * *